United States Patent [19]
Yen et al.

[11] Patent Number: 5,291,812
[45] Date of Patent: Mar. 8, 1994

[54] TURNING APPARATUS WITH IMPROVED CHIP HANDLING

[75] Inventors: David W. Yen, Rochester Hills; John Alverio, Shelby Township, Macomb County, Mich.

[73] Assignee: General Motors Corporation, Detroit, Mich.

[21] Appl. No.: 327,188

[22] Filed: May 22, 1992

[51] Int. Cl.⁵ .............................................. B23B 27/22
[52] U.S. Cl. ........................................ 82/134; 82/901; 82/904; 408/17
[58] Field of Search ............................ 82/158, 1–11, 82/901, 904, 133, 134; 408/17

[56] References Cited

U.S. PATENT DOCUMENTS

| | | | |
|---|---|---|---|
| 2,581,258 | 1/1952 | Karweit | 408/17 |
| 3,174,404 | 3/1965 | Findley | 90/24 |
| 4,620,121 | 10/1986 | Mishiro | 310/323 |
| 4,646,595 | 3/1987 | Slee | 82/2 |
| 4,667,546 | 5/1987 | Dombrowski et al. | 82/1 |
| 4,683,788 | 8/1987 | Kronawittleithner et al. | 82/47 |
| 5,019,115 | 5/1991 | Schneider et al. | 82/1.11 |

*Primary Examiner*—Z. R. Bilinsky
*Attorney, Agent, or Firm*—Patrick M. Griffin

[57] ABSTRACT

A metal turning chip breaking apparatus includes an impulse actuator in the form of a piezoelectric element that rapidly expands and contracts in response to a rapidly applied and removed voltage. This, in turn, is used to impulsively move a cutter support in a matching fashion, causing a cutter to rapidly withdraw from and return to the cut in a chopping action. This breaks up the chip, which would otherwise form continuously. There is no need to synchronize the incremental motion of the cutter with the rotation of the workpiece.

3 Claims, 2 Drawing Sheets

TURNING APPARATUS WITH IMPROVED CHIP HANDLING

This invention applies to an apparatus and method for metal turning in which the continuously formed chip is broken as it is formed.

BACKGROUND OF THE INVENTION

Metal turning basically involves rotating a metal workpiece while simultaneously moving a tool holder axially along the workpiece. The tool holder incorporates a cutter that is advanced radially relative to the surface of the workpiece so that a metal chip is continuously formed, which curls away from the workpiece, generally in a tight spiral. The cutter is advanced radially to the greatest degree possible, and the tool holder moved with the greatest axial feed possible, without creating excessive cutting forces. For any given radial advance and axial feed, the chip produced will have a predetermined and relatively constant radial width and axial thickness, both of which are relatively small. The length of the chip, however, will be potentially very great, as there is nothing to break it beyond its own weight, or contact with another object. For maximum efficiency in chip handling, it would be desirable to repeatedly break up the chip as it was formed.

It is known in the art to repeatedly break the chip as it is formed with various apparatuses that vibrate the cutter axially back and forth relative to the tool holder as it moves. Known apparatuses that do this vibrate the cutter continually, creating a sinusoidal pattern relative to the circular surface of the workpiece, and so require that the vibration of the cutter be deliberately kept in an out-of-phase relationship to the rotation of the workpiece. If the two were not kept out-of-phase, the chips would not break up. Instead, long chips would continuously form that also had a wavy shape superimposed upon their length, but which would not break any more readily than a straight chip. There are several examples of patented apparatuses and methods designed to assure the necessary out-of-phase relation.

SUMMARY OF THE INVENTION

The invention provides a new method and apparatus to repeatedly break chips that does not rely on superimposing a continual, vibratory motion onto the axial feed of the cutter. There is no need to assure an out-of-phase relationship between the cutter vibration and workpiece rotation.

In the preferred embodiment disclosed, a workpiece is rotated about its axis and a tool holder is moved axially along the rotating workpiece, just as in conventional turning. The tool holder includes a cutter support that is adapted to withdraw and return axially relative to the tool holder in incremental fashion when an axial force is applied to it. In the embodiment disclosed, the cutter support is in the nature of a cantilever beam that can be bent out away from the tool holder when forced, and which springs back when released. A conventional cutter bit fixed to the end of the cutter support is advanced radially relative to the workpiece, engaging its surface and producing a continuous chip as the tool holder moves.

Rather than applying a vibratory force to the cutter support, a means is provided that applies an impulsive, rapidly applied and removed axial force. In the embodiment disclosed, this comprises a piezoelectric element, which is capable of rapid, though slight, expansion and contraction in response to a rapidly changing voltage, which is supplied by a controller. The controller keeps the voltage normally high, which keeps the piezoelectric element slightly expanded. The slight expansion is amplified by a master and slave piston assembly into an axial motion of the cutter support that is sufficient to keep the cutter support axially advanced and under tension relative to the tool holder as it cuts. When the voltage is rapidly dropped, the element contracts rapidly, and the cutter support and cutter rapidly withdraw from the cut. The same voltage is very quickly reapplied, causing the cutter to return to its original position and break the chip. The degree of incremental cutter withdrawal is designed to be comparable to the degree of axial cutter feed per workpiece revolution, assuring that the chip is cut. The pattern produced by the cutter relative to the workpiece surface is not sinusoidal. Instead, the motion is sharply changing and choppy, so there is no need to keep the cutter motion and workpiece rotation out of phase. The frequency of cutter withdrawal and advance may simply be set so as to break the chip into any desired length.

It is, therefore, a general object of the invention to provide a metal turning chip breaking method that does not require keeping the cutter vibration and workpiece rotation out-of-phase.

It is another object of the invention to break the chips by applying an impulsive force to the cutter to rapidly withdraw and return the cutter from and to the cut in an incremental fashion.

It is another object of the invention to provide such an impulsive force through the use of a piezoelectric element that has a rapidly increasing and decreasing voltage applied to it.

It is still another object of the invention to provide a means for amplifying the slight expansion and contraction of the element sufficiently to advance and withdraw the cutter sufficiently to break the chip.

DESCRIPTION OF THE PREFERRED EMBODIMENT

These and other objects and features of the invention will appear from the following written description, and from the drawings, in which.

Figure 1:
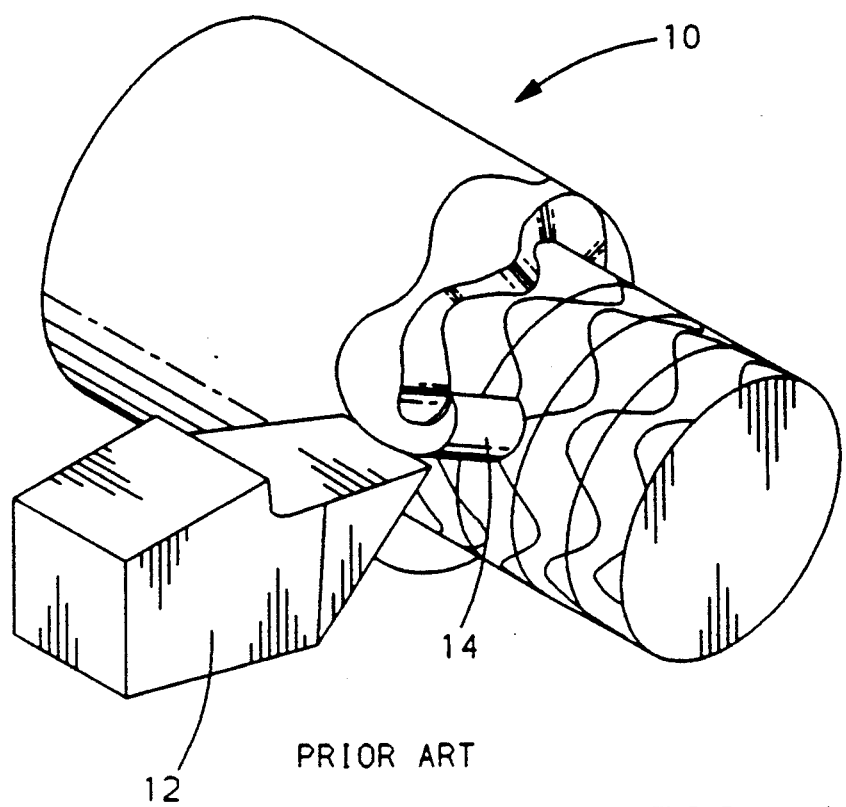
FIG. 1 is a perspective view of the known method of chip breaking described above.

Referring first to FIG. 1, the known method of chip breaking described above is illustrated. A workpiece (10), which is cylindrical metal bar stock, is to be turned down from a rough, initial diameter to a final, finished diameter. To accomplish this, workpiece (10) is rotated about it's central axis by a standard lathe or the like, not illustrated, while a cutter (12) is moved parallel to the axis of workpiece (10). Before moving axially, cutter (12) is radially advanced to a point where it is radially inboard of the outer surface of workpiece (10), and so will engage its surface. Cutter (12) is adjusted and moved by a conventional tool holder, which is not illustrated, but well known to those skilled in the art.

How far cutter (12) is advanced radially, how fast it is rotated, and how far it is fed axially per rotation depend on the cutter (12), the workpiece material, and the surface finish required. Basically, experience will tell how hard cutter (12) can be driven without causing excess cutting forces, chatter, or excessive tool wear, and this can be determined by one skilled in the art. Whatever the parameters of cutter (12)'s operation, it will continuously produce a chip (14) from workpiece (10), which curls out and away from cutter (12) as illustrated.

Still referring to FIG. 1, the width of chip (14) corresponds to the radial advance of cutter (12), and its axial thickness corresponds to the axial feed per rotation, but it's length may vary considerably. In the absence of some mechanism to actively break it up, chip (14) could conceivably be as long as the entire linear surface seen by cutter (12) in each pass, especially with ductile materials. Illustrated is a known method of repeatedly breaking chip (14). The successive circular lines on the finished surface of workpiece (10) represent the path that would be followed by the point of cutter (12) if it had no axial vibration superimposed on its axial feed. This would leave the familiar threaded pattern that can be seen on many machined shafts. Instead, cutter (12) is vibrated back and forth in the axial direction as it advances, with an amplitude close to the degree of axial advance per revolution of workpiece (10). Cutter (12) vibrates constantly, that is, it is never still relative to it's tool holder. This constant vibration, coupled with the rotation of workpiece (10), causes cutter (12) to describe a sinuous wave pattern on the machined surface, as shown by the wavy lines. This superimposed vibration of cutter (12) will break the chips (14), but only if the vibration can be kept deliberately out-of-phase with the rotation.

Figure 2:
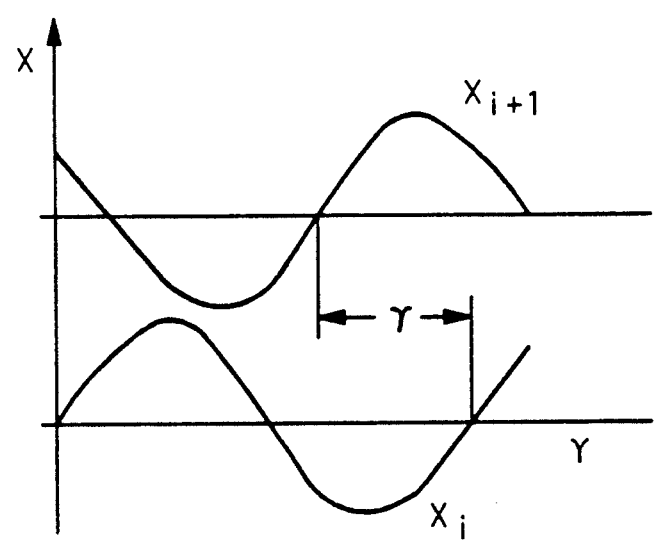
FIG. 2 is a graph depicting the out-of-phase relationship created by the known chip breaking method.

Referring next to FIG. 2, the out-of-phase relation is shown graphically. The X axis represents the axial vibration amplitude, Y represents distance along the surface of workpiece (10), $X_i$ and $X_{i+1}$ represent successive rotations, and y represents the phase shift between them. A deliberate phase shift assures that peaks and valleys of successive cuts are nearly aligned. Thus, the cutter (12) will be pushed into the thinnest part of the chip that was created on the prior pass, which will cause it to break. Otherwise, the wave patterns would be always parallel, producing a chip that was wavy, but still continuous. The apparatuses and methods used to assure a phase shift are complex and expensive, but necessary.

Figure 3:
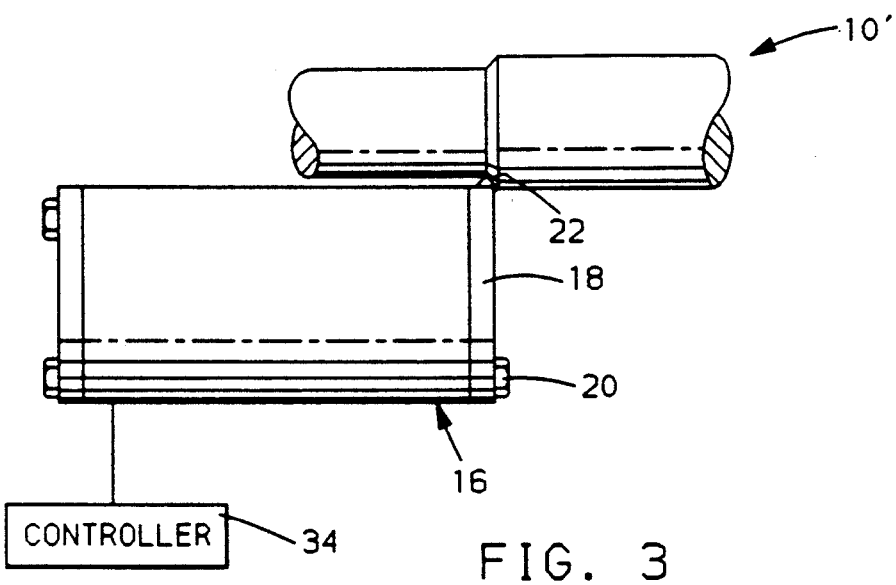
FIG. 3 is a partially schematic representation of a workpiece and the apparatus of the invention.
Figure 4:
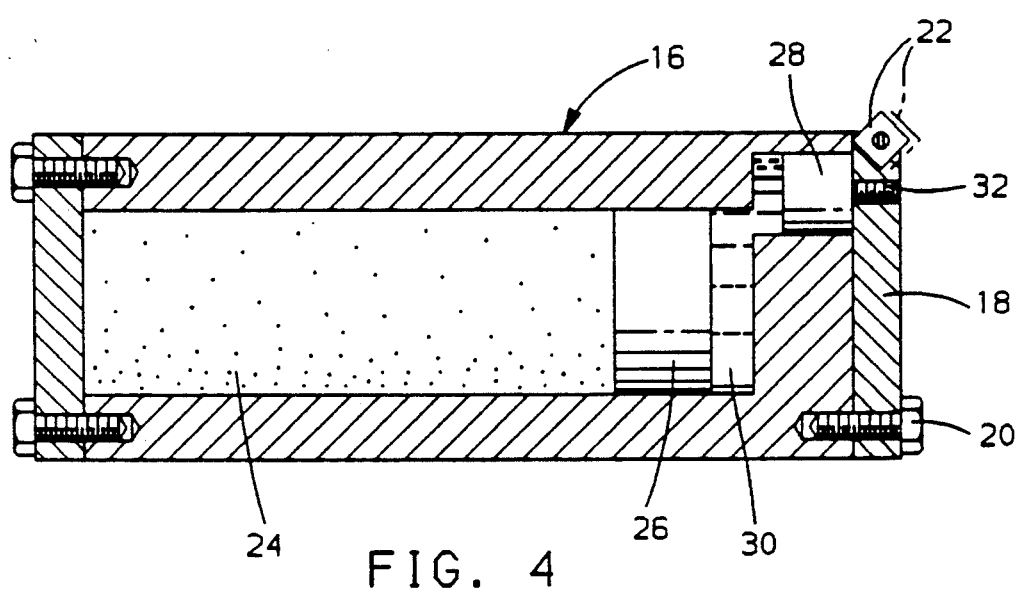
FIG. 4 is a cross sectional view of the tool holder, cutter support, cutter and force application means.

Referring next to FIGS. 3 and 4, a preferred embodiment of the invention is shown. The same workpiece, indicated at 10', is machined, with the same rates of rotation, radial advance, and axial feed. A tool holder, indicated generally at (16), is basically a hollow steel cylinder, capped at one end by a steel plate (18) that is bolted on its lower side at (20) and free on the opposite side. Plate (18) is thus capable of bending to an extent about the single bolt (20). The free side of plate (18) also supports a cutter (22), which could be any commercially available cutter, generally referred to as an insert. Cutter (22) is oriented so that its cutting edge is clear of and leads the tool holder (16). The interior of tool holder (16) comprises a stepped bore that contains an impulse actuator (24), which closely fills much of the bore. Impulse actuator (24) as disclosed is a cylindrical block of a piezoelectric material, such as $PbZrO_3$-$PbTiO_3$. Piezoelectrics are capable of very rapid expansions and contractions in length in response to a rapid applied voltage change, which results from shape deformations induced in their crystalline structure. Specifically, it would expand in response to a raised voltage, and contract in response to a lowered voltage, to a degree of perhaps 0.1 or 0.2 percent. While the percentage change is not great, the response time is rapid, on the order of a millisecond. Ahead of actuator (24) is a master piston (26), which engages the end of actuator (24), and a radially offset, smaller diameter, slave piston (28), which engages plate (18) near cutter (22). Separating pistons (26) and (28) is a chamber (30) filled with hydraulic fluid. An adjusting set screw (32) threaded through plate (18) engages the end of slave piston (28). Completing the apparatus is a controller (34), a commercially available impulse voltage generator which is generally called a fast switching controller. Controller (34), as its name indicates, is normally used to provide ultra fast on-off switching of electrical components, and is capable of dropping and reapplying a required voltage and current, in less than a millisecond.

Still referring next to FIGS. 3 and 4, the operation of the invention is described. When tool holder (16) is moved, cutter (22) engages the surface of workpiece 10' and produces a chip as in any conventional turning operation. The chip breaking motion superimposed on cutter (22) is different, however. A constant voltage is normally applied to actuator (24) by controller (34). The normal voltage keeps actuator (24) in an expanded condition. The expansion of actuator (24) pushes master piston (26) forward, a motion that is amplified by chamber (30) into a greater axial advance of slave piston (28). Slave piston (28), in turn, pushes plate (18) out and away slightly, advancing cutter (22), and putting plate (18) under residual tension. Set screw (32) is adjusted so as to assure that plate (18) responds quickly to slave piston (28), with no lost motion. When the voltage is removed, actuator (24) contracts just as quickly, and cutter (22) withdraws as plate (18) springs back. When the voltage is dropped and reapplied during the cutting process, cutter (22) is withdrawn from the cut slightly, and then pushed back quickly into it. If the increment of superimposed axial motion is sufficient, the chip will be severed with a quick, chopping action. The increment of axial movement of cutter (22) need not be very great, perhaps only 80% of the axial feed per revolution, which could be in the order of 0.01 inches.

Figure 5:
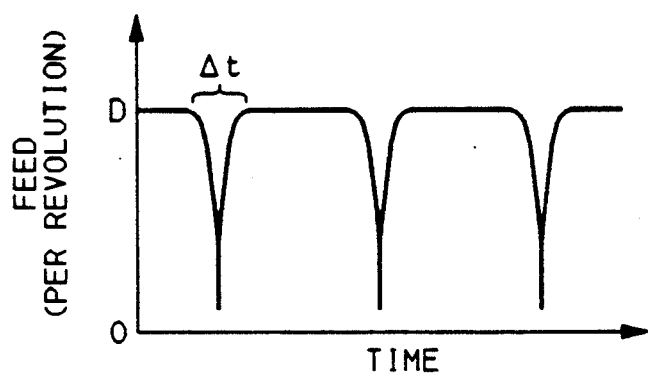
FIG. 5 is a graph depicting the chip breaking action provided by the invention.

Referring next to FIG. 5, the result of the operation described is shown graphically. The axial feed per revolution is indicated at D. As noted above, the speed at which controller (34) switches is very rapid, indicated at Δt, and the wave form that results is correspondingly sharp and choppy, not sinusoidal. This is because cutter (22) is normally still (relative to tool holder (16)), and is withdrawn and returned in impulsive, rapid fashion, rather than continually moving. The frequency with which controller (34) would be switched off and on would be determined only by how frequently it was desired to break the chip, which would, in turn, simply depend on how short a chip was desired. The surface speed at which cutter (22) moves relative to workpiece (10') is calculable for any given rotation rate and circumference of workpiece (10'), and, divided by the desired chip length, yields the necessary pulsing frequency. There is no need to synchronize the impulse frequency with the rate of rotation of workpiece (10'), because the chopping action works independently from one rotation to the next. There is no need to avoid in-phase sinusoidal patterns, as with the known methods of chip breaking.

Variations of the embodiment disclosed could be made. The same principal of impulsive, short burst actuation of a tool holder, resulting in equally fast, incremental motion of a tool, could be applied to other machining processes in which a chip is continuously formed. For example, in boring or drilling operations, chips are continuously formed by the drill cutting edges as they turn against a cone shaped cutting interface at the bottom of the hole. It is far easier to flush and expel chips from the hole if they are broken up into smaller pieces, and drill wear and penetration rates depend on efficient chip flushing. In boring, the tool rotates, rather than the workpiece, but if the same impulsive chopping motion could be created in the drill, its edges could accomplish the same chopping action. Such an apparatus would require some kind of support mechanism, such as a slip ring, which would allow the axial motion of a non rotating impulse actuator to be effectively applied to the rotating drill, in the same way that the pushing force of a stationary clutch release lever is applied to a spinning clutch through the medium of a clutch release bearing. As well as boring and drilling, the same basic concept could be applied to any operation where a continuous chip is formed by a cutter, such as grooving, broaching, or cut off operations. The common thread is the impulsive actuation of the cutting tool in a direction generally perpendicularly to the direction the chip that the tool is continuously forming, thereby creating the chopping, chip cutting action.

In the turning operation illustrated, or other chip forming process, impulse actuators made of different materials could be used, so long as they had the same characteristic response of rapid, impulsive expansion and contraction. For example, magnetostrictive materials exist which expand and retract quickly in response to an applied magnetic field. A different means could be used to amplify the action of the actuator, such as a lever. Or, in other cases, especially with small rates of axial feed, no amplification might be necessary, and the actuator could act directly on the cutter. Through a multiplexing arrangement, the signal from one controller could be fed to several tooling stations. Therefore, it will be understood that it is not intended to limit the invention to just the embodiment disclosed.

The embodiments of the invention in which an exclusive property or privilege is claimed are defined as follows:

1. An apparatus for use with a cutting tool of the type that continuously forms a chip in a predetermined direction from a workpiece, comprising, a support for said tool adapted to withdraw and return said tool relative to said chip in incremental fashion in a direction generally perpendicular to the direction of chip formation when a impulsive force is applied thereto, and, impulsive force application means operatively connected to said support to apply said impulsive axial force to said tool of sufficient amplitude to cause said cutter to withdraw and return relative to said chip by an increment sufficient to break said chip as it is continuously formed.

2. A turning apparatus for use in machining a workpiece that is rotated about an axis, comprising, a tool holder movable axially relative to said rotating workpiece, a cutter support on said tool holder adapted to withdraw and return axially relative to said tool holder in incremental fashion when an axial force is applied thereto, a cutter rigidly fixed to said cutter support and engageable with said rotating workpiece as said tool holder moves to produce a continuous chip from said workpiece, means on said tool support operable as said tool holder moves to apply an impulsive axial force to said cutter support of sufficient amplitude to cause said cutter to withdraw and return axially of said workpiece with an increment sufficient to break said continuously formed chip.

3. A turning apparatus for use in machining a workpiece that is rotated about an axis, comprising, a tool holder movable axially relative to said rotating workpiece, a cutter support on said tool holder adapted to withdraw and return axially relative to said tool holder in incremental fashion when an axial force is applied thereto, a cutter rigidly fixed to said cutter support and engageable with said rotating workpiece as said tool holder moves to produce a continuous chip from said workpiece, an impulse actuator on said tool holder operatively engaged with said cutter support and responsive to a rapid applied voltage change to expand and contract rapidly and thereby apply an impulsive force to said cutter support of sufficient amplitude to cause said cutter to withdraw and return axially of said workpiece with an increment sufficient to break said continuously formed chip, and, a controller for applying a rapidly changing voltage to said impulse actuator.

* * * * *